(12) United States Patent
Im et al.

(10) Patent No.: US 11,898,290 B2
(45) Date of Patent: Feb. 13, 2024

(54) LAUNDRY TREATING APPLIANCE AND METHOD FOR CONTROLLING THE SAME

(71) Applicant: LG Electronics Inc., Seoul (KR)

(72) Inventors: Myunghun Im, Seoul (KR); Hwanjin Jung, Seoul (KR); Jaehyun Kim, Seoul (KR); Kyungchul Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 148 days.

(21) Appl. No.: 17/612,054

(22) PCT Filed: May 15, 2020

(86) PCT No.: PCT/KR2020/006450
§ 371 (c)(1),
(2) Date: Nov. 17, 2021

(87) PCT Pub. No.: WO2020/235888
PCT Pub. Date: Nov. 26, 2020

(65) Prior Publication Data
US 2022/0235507 A1    Jul. 28, 2022

(30) Foreign Application Priority Data

May 17, 2019    (KR) ................ 10-2019-0058355

(51) Int. Cl.
*D06F 34/18*    (2020.01)
*D06F 33/32*    (2020.01)
*D06F 37/30*    (2020.01)

(52) U.S. Cl.
CPC .............. *D06F 34/18* (2020.02); *D06F 33/32* (2020.02); *D06F 37/304* (2013.01)

(58) Field of Classification Search
CPC ...................................................... D06F 34/18
See application file for complete search history.

(56) References Cited

U.S. PATENT DOCUMENTS

2006/0238152 A1    10/2006 Marioni
2010/0089600 A1    4/2010 Borinato et al.
(Continued)

FOREIGN PATENT DOCUMENTS

CN        1943102       4/2007
CN        102277706     12/2011
(Continued)

OTHER PUBLICATIONS

Office Action in Chinese Appln. No. 202080036833.7, dated Feb. 18, 2023, 12 pages (with Machine translation).
(Continued)

*Primary Examiner* — Jason Y Ko
(74) *Attorney, Agent, or Firm* — Fish & Richardson P.C.

(57) ABSTRACT

The laundry treating appliance according to the present disclosure may comprise a drum that receives laundry and is capable of rotating, a motor rotating the drum, a current detector detecting a current of the motor and a controller controlling the motor to accelerate rotation of the drum and obtaining a function of current change based on the current detected by the current detector during the acceleration of the drum, and determining a first motion speed based on decreasing of a first derivative of the function of current change, wherein the controller controls the motor to stop and then controls the motor to rotate in the first motion speed.

20 Claims, 12 Drawing Sheets

(56) References Cited

U.S. PATENT DOCUMENTS

| | | | |
|---|---|---|---|
| 2012/0084997 | A1 | 4/2012 | Bellinger et al. |
| 2014/0082958 | A1 | 3/2014 | Chung et al. |
| 2015/0354124 | A1 | 12/2015 | Halbleib et al. |

FOREIGN PATENT DOCUMENTS

| | | |
|---|---|---|
| CN | 103668863 | 3/2014 |
| JP | 2008-000503 | 1/2008 |
| KR | 20080102610 | 11/2008 |
| KR | 10-2011-0022294 | 3/2011 |

OTHER PUBLICATIONS

Extended European Search Report in European Appln. No. 20809344.3, dated May 23, 2023, 9 pages.
International Search Report in International Appln. No. PCT/KR2020/006450, dated Sep. 16, 2020, 3 pages.

(a)

(b)

(c)

LAUNDRY TREATING APPLIANCE AND METHOD FOR CONTROLLING THE SAME

CROSS-REFERENCE TO RELATED APPLICATIONS

This application is a National Stage application under 35 U.S.C. § 371 of International Application No. PCT/KR2020/006450, filed on May 15, 2020, which claims the benefit of Korean Patent Application No. 10-2019-0058355, filed on May 17, 2019. The disclosures of the prior applications are incorporated by reference in their entirety.

TECHNICAL FIELD

The present disclosure relates to a laundry treating appliance and a method for controlling the same which is capable of controlling a speed of a drum based on machine learning.

BACKGROUND ART

A laundry treating appliance is a device for treating in washing, rinsing, dehydrating and/or drying, etc. The laundry treating appliance has a tub which is rotated by a motor.

Recently, interest in machine learning such as artificial intelligence, deep learning, and the like, has been increasing significantly.

There was a statistical-based classification, regression and cluster models in the center of conventional machine learning. Particularly in the supervised learning of classification and regression models, human beings have previously defined properties of learning data and learning model distinguishing new data based on the properties. On the other hand, there is deep learning that a computer on its own figure out properties and distinguishes.

One of the factors that accelerated the development of deep learning is the deep learning framework offered as an open-source. For example, deep learning frameworks include Theano at Montreal University in Canada, Torch at New York University in the U.S., Caffe at Berkeley University in California, and TensorFlow at Google.

In order to effective learning and recognition according to the disclosure of deep learning frameworks, learning processes, learning methods, data extraction used for learning and data selection are getting important in addition to deep learning algorithms. Further, research for applying artificial intelligence and machine learning to various products and services is increasing.

Korean Registration Patent No. 10-1841248 (hereinafter referred to as conventional configuration) discloses a method of determining amount of laundry put in a drum of a drum using artificial intelligence technology based on machine learning. The conventional configuration discloses adding up speed of a motor obtained at a given time interval while accelerating the motor to a target speed, and then amount of laundry is determined by using a value added as input data of an artificial neural network.

Herein, the amount of laundry means a quantitative property. It is merely that reflecting the load exerted on the motor by a laundry put into the drum. That is, the conventional configuration fails to disclose providing information on the flow characteristics of the laundry in the drum during accelerating the speed of the drum.

DISCLOSURE

Technical Problem

One object of the present disclosure is to provide a laundry treating appliance and method for controlling the same capable of assuming flow characteristic of laundry put into a drum based on machine learning, and then controlling rotation of the drum according to the flow characteristic assumed.

Another object of the present disclosure is to provide a laundry treating appliance and method for controlling the same capable of setting speed of a drum in rolling motion, tumbling motion and/or filtration motion so as to corresponded to characteristic (or state) of laundry put into a drum.

Another object of the present disclosure is to provide a laundry treating appliance and method for controlling the same capable of controlling the drum in more proper manner according to characteristic of laundry by taking account of a difference of the flow characteristic even if an amount of laundry is the same as previous laundry.

Objects of the present disclosure should not be limited to the aforementioned objects and other unmentioned objects will be clearly understood by those skilled in the art from the following description.

Technical Solution

In accordance with an embodiment of the present disclosure, the above and other objects can be accomplished by the provision of a laundry treating appliance including a drum that receives laundry and is capable of rotating, a motor rotating the drum, a current detector detecting a current of the motor and a controller controlling rotation of the motor. The controller is configured to accelerate rotation of the drum, obtain current change function based on current values detected by the current detector at a predetermined time interval during the acceleration of the drum, and determine a first motion speed based on a value of a first derivative of the current change function. The controller is configured to control the motor to rotate in the first motion speed after determining the first motion speed.

The current change function is a continuous function. The current change function is the continuous function representing the current of the motor according to a rotational speed of the motor.

The predetermined time interval may be set constant. The current detector may periodically detect the current values of the motor during the acceleration of the drum.

The first motion speed may be determined based on a rotation speed of the motor corresponding to a predetermined value when the first derivative is decreased and then is less than the predetermined value.

The rotation speed of the motor corresponding to the predetermined value may be in a range from 10 rpm to 40 rpm.

The motion speed may be less than the predetermined value.

When the motor is rotated in the first motion speed, the laundry in the drum may be repeatedly controlled to be descended at a position of less than 90 degrees with respect to a rotation direction of the drum 4 and then to be fallen.

The controller may obtain an inflection point at which the value of the second derivative in the current change graph changes from negative to positive while the drum is accelerating beyond a rotation speed of the motor corresponding to the predetermined value, the controller determining a second motion speed based on the rotation speed of the motor corresponding to the inflection point, the controller controlling stopping rotation of the motor after controlling the motor to rotate in the first motion speed, the controller controlling the motor to rotate in the second motion speed.

The rotation speed of the motor corresponding to the inflection point may be in a range from 40 rpm and 60 rpm.

The second motion speed may be determined to be less than the rotation speed of the motor corresponding to the inflection point.

The laundry in the drum repeatedly may rise and fall to certain position less than 90 to 110 degrees in a rotating direction of the drum while the motor is rotated in the second motion speed.

The controller may accelerate the motor to rotate in a speed of range from 1.5 rpm/s to 2.5 rpm/s while the drum is accelerated.

In accordance with the other embodiment of the present disclosure, the above and other objects can be accomplished by the provision of a laundry treating appliance including a drum that receives laundry and is capable of rotating, a motor rotating the drum, a current detector detecting a current of the motor and a controller controlling the motor to accelerate rotation of the drum and obtaining a current change graph based on the current detected by the current detector during the acceleration of the drum, and obtaining a inflection point at which the value of the second derivative in the current change graph changes from negative to positive, the controller determining a motion speed based on a rotation speed of the motor corresponding to the inflection point, wherein the controller controls the motor to stop and then controls the motor to rotate in the first motion speed.

The rotation speed of the motor corresponding to the inflection point may be in speed of a range from 40 rpm and 60 rpm.

The motion speed may be determined to be less than the rotation speed of the motor corresponding to the inflection point.

The laundry in the drum repeatedly may rise and fall to certain position less than 90 to 110 degrees in a rotating direction of the drum while the motor is rotated in the motion speed.

The controller may accelerate the drum in a speed of range from 1.5 rpm/s to 2.5 rpm/s while the drum is accelerated.

In accordance with another embodiment of the present disclosure, the above and other objects can be accomplished by the provision of a laundry treating appliance including a drum that receives laundry and is capable of rotating, a motor rotating the drum, a current detector detecting a current of the motor and a controller controlling the motor to accelerate, the controller determining a motion speed of the drum in a drive motion set corresponding to a decision section based on the current value detected by the current detector in the decision section while the drum is rotating at an accelerated speed, wherein the controller obtains the motion speed by inputting a current value obtained from the decision section into the input layer and by outputting the inputted current to an output layer of the artificial neural network, wherein the artificial neural network is previously learned by the machine learning.

The controller may control the motor to accelerate from a first rotation speed to a second rotation speed, wherein the first rotation speed is in a range from 10 rpm to 20 rpm, wherein the second rotation speed is in a range from 80 rpm to 100 rpm.

The decision section may be a section reaching 40 rpm in the first rotation speed, wherein the drum in a drive motion is in a rolling motion controlled to rotate in the motion speed so that laundry in the drum is repeatedly rose and fell to a position less than 90 degrees in a rotating direction of the drum.

The decision section may be a section in a range from 40 rpm to 60 rpm, wherein the drum in a drive motion is in a tumbling motion controlled to rotate in the motion speed so that the laundry in the drum is repeatedly rose and fell to a position less than 90 degrees to 110 degrees in a rotating direction of the drum.

The decision section may be a section in a range from 60 rpm to 80 rpm, wherein the drum in a drive motion is in a filtration motion controlled to rotate in the motion speed so that the laundry is remained attached to the drum when the drum is rotated in one direction more than one revolution.

The controller may accelerate the motor in a speed over 1.5 rpm/s to 2.5 rpm/s.

Opposing that speed increasing section in the rotation speed of the motor during acceleration of the drum is divided into a first speed section, a second speed section and a third speed section, the drum in a drive motion is determined to be in a rolling motion corresponding to the first speed section, is determined to be in a tumbling motion corresponding to the second speed section and is determined to be in a filtration motion corresponding to the third speed section, wherein the rolling motion is controlling the drum so that the laundry in the drum is repeatedly controlled to be descended at a position of less than 90 degrees with respect to a rotation direction of the drum 4 and then to be fallen, wherein the tumbling motion is controlling the drum so that the laundry in the drum repeatedly rises and falls to certain position less than 90 to 110 degrees in a rotating direction of the drum, wherein the filtration motion is controlling the drum so that the laundry is remained attached to the drum when the drum is rotated in one direction more than one revolution.

The laundry treating appliance may further comprise a speed detector for detecting rotation speed of the motor, wherein the controller selects current value corresponding to the decision section at where the rotation speed of the motor is corresponded among current values obtained by the current detector, wherein the controller uses the selected current value as an input value of the input layer.

The controller may control the motor so that the drum is rotated in a state of being maintained in the predetermined motion speed.

In accordance with another embodiment of the present disclosure, the above and other objects can be accomplished by the provision of a method for controlling a laundry treating appliance including (a) step for accelerating a drum in which laundry is put, (b) step for obtaining a current value of the motor that rotates the drum in a section in which the drum is accelerated, (c) step for determining a motion speed of the drum in a drive motion set corresponding to the decision section based on the current value detected by the current detector in the decision section while the motor is rotating at an accelerated speed, wherein the controller obtains the motion speed by inputting a current value obtained from the decision section into the input layer and by outputting the inputted current to an output layer of the artificial neural network, wherein the artificial neural network is previously learned by the machine learning and (d) step for controlling the motor so that the drum is rotated in the predetermined motion speed.

The step (a) may comprise controlling the motor to rotate in a rotation speed from a first rotation speed to a second rotation speed, wherein the first rotation speed is in a range from 10 rpm to 20 rpm, wherein the second rotation speed is in a range from 80 rpm to 100 rpm.

The decision section may be a section reaching 40 rpm in the first rotation speed, wherein the drum in a drive motion is in a rolling motion controlled to rotate in the motion speed so that laundry in the drum is repeatedly rose and fell to a position less than 90 degrees in a rotating direction of the drum.

The decision section may be a section in a range from 40 rpm to 60 rpm, wherein the drum in a drive motion is in a tumbling motion controlled to rotate in the motion speed so that the laundry in the drum is repeatedly rose and fell to a position less than 90 degrees to 110 degrees in a rotating direction of the drum.

The decision section may be a section in a range from 60 rpm to 80 rpm, wherein the drum in a drive motion is in a filtration motion controlled to rotate in the motion speed so that the laundry is remained attached to the drum when the drum is rotated in one direction more than one revolution.

The step (a) may comprise accelerating the motor in a speed of range from 1.5 rpm/s to 2.5 rpm/s.

Opposing that speed increasing section in the rotation speed of the motor during acceleration of the drum is divided into a first speed section, a second speed section and a third speed section, the drum in a drive motion is determined to be in a rolling motion corresponding to the first speed section, is determined to be in a tumbling motion corresponding to the second speed section and is determined to be in a filtration motion corresponding to the third speed section, wherein the rolling motion is controlling the drum so that the laundry in the drum is repeatedly controlled to be descended at a position of less than 90 degrees with respect to a rotation direction of the drum 4 and then to be fallen, wherein the tumbling motion is controlling the drum so that the laundry in the drum repeatedly rises and falls to certain position less than 90 to 110 degrees in a rotating direction of the drum, wherein the filtration motion is controlling the drum so that the laundry is remained attached to the drum when the drum is rotated in one direction more than one revolution.

Advantageous Effects

The laundry treating appliance and method for controlling the same including the same according to the present disclosure provide at least the following effects.

First, it is possible to set a motion speed with displacement point obtained from an electric current pattern (or function) occurred by accelerating the drum in a range of a predetermined speed. Herein, the displacement point obtained from the electric current pattern is related with a maximum speed causing a predetermined motion in a state of laundry put into the drum. Particularly in a case that the displacement point is obtained based on decreasing value in a first derivative of a current change graph, a rotation speed corresponding to the displacement point is highly related with a maximum speed causing a rolling motion. Therefore, it is possible to realize a rolling motion optimized according to a state of current laundry.

Alternatively, the displacement point may be an inflection point that a second derivative value of the function of current change is changed from negative to positive. In this case, a rotation speed corresponding to the displacement point is highly related with a maximum speed causing the tumbling motion. Therefore, it is possible to realize a tumbling motion optimized according to a state of laundry by setting a control speed of the tumbling motion taking into account of a rotation speed corresponding to the displacement point.

A laundry treating appliance and method for controlling the same according to the other exemplary embodiment of the present disclosure is able to analyze a current pattern of a motor based on machine learning-based artificial neural network. Particularly, the current pattern is changed according to a state of laundry contained in a drum. Specifically, it is related with various characteristics of the laundry including flow of laundry, amount of laundry, properties of laundry, and the like. Therefore, it is possible to set motion speed optimized according to a state of laundry put into the drum by using the electric current pattern as input data of artificial neural network established by learning based on machine learning, and in doing so, it is possible to improve washing performance by controlling rotation of the drum.

Second, it is possible to set a speed (e.g., motion speed) of the drum in rolling motion, tumbling motion and/or filtration motion so that it is optimized according to characteristic (or state) of laundry put into the drum.

Third, it is possible to set variably motion speed in rolling motion, tumbling motion and/or filtration motion according to flow characteristic of laundry, so it is advantageous of treating laundry in more proper manner according to the characteristic of laundry.

It should be understood that advantageous effects according to the present invention are not limited to the effects set forth above and other advantageous effects of the present disclosure will be apparent from the detailed description of the present disclosure.

MODE FOR INVENTION

Figure 1:
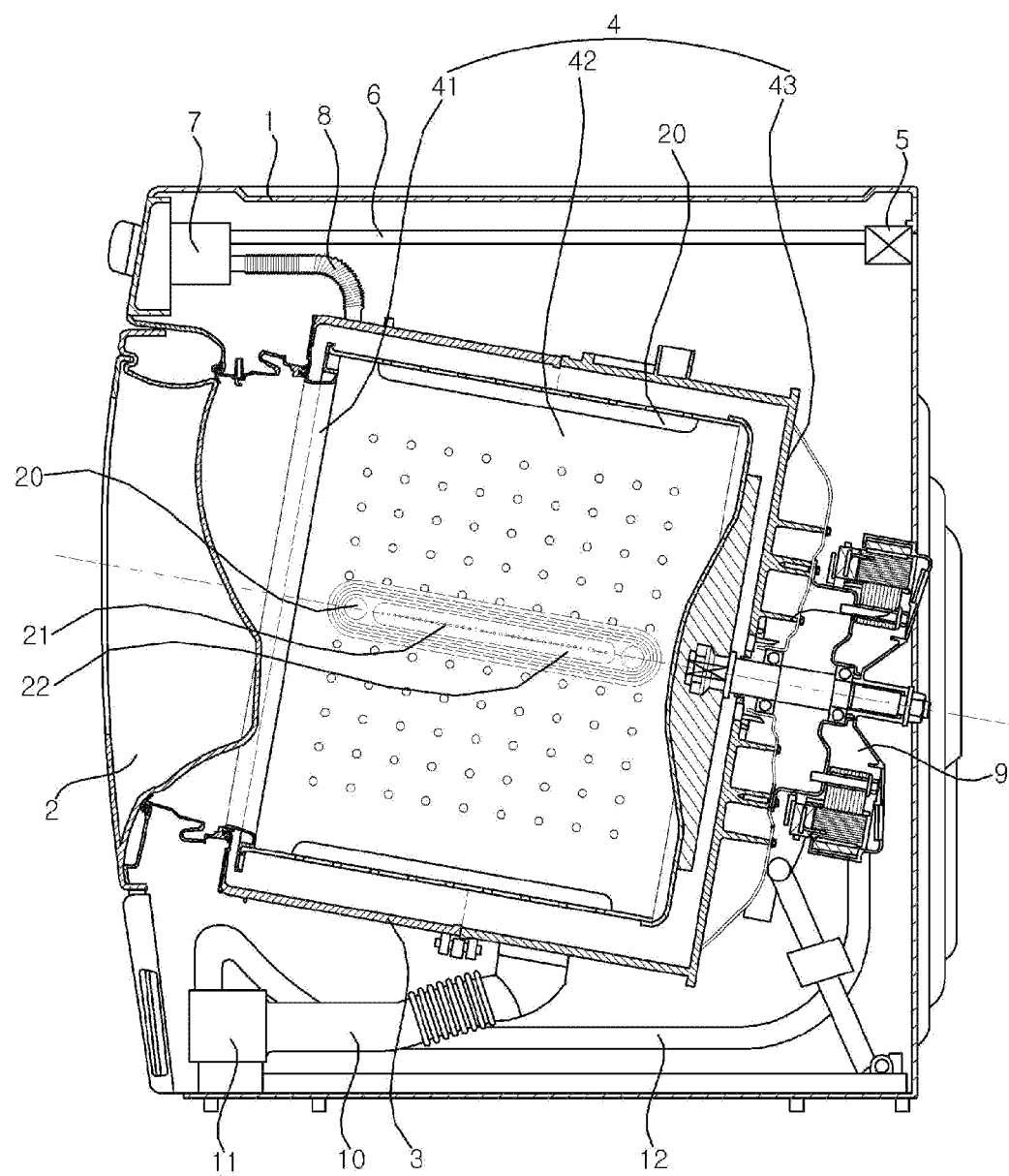
FIG. 1 is a lateral cross-sectional view showing a laundry treating appliance according to an exemplary embodiment of the present disclosure.

Advantages and features of the present disclosure and methods of achieving the advantages and features will be apparent with reference to embodiments described below in detail in conjunction with the accompanying drawings. However, the present disclosure is not limited to embodiments disclosed below, but may be implemented in various forms, only the present embodiments are provided so that a disclosure of the present disclosure is complete and a disclosure of a scope of the invention is fully understood by those skilled in the art to which the present disclosure belongs, and the present disclosure is only defined by the scope of the claims. The same reference numerals indicate the same components through the specification.

Hereinafter, an air-conditioner according to an exemplary embodiment of the present disclosure will be described with the accompanying drawings.

Figure 2:
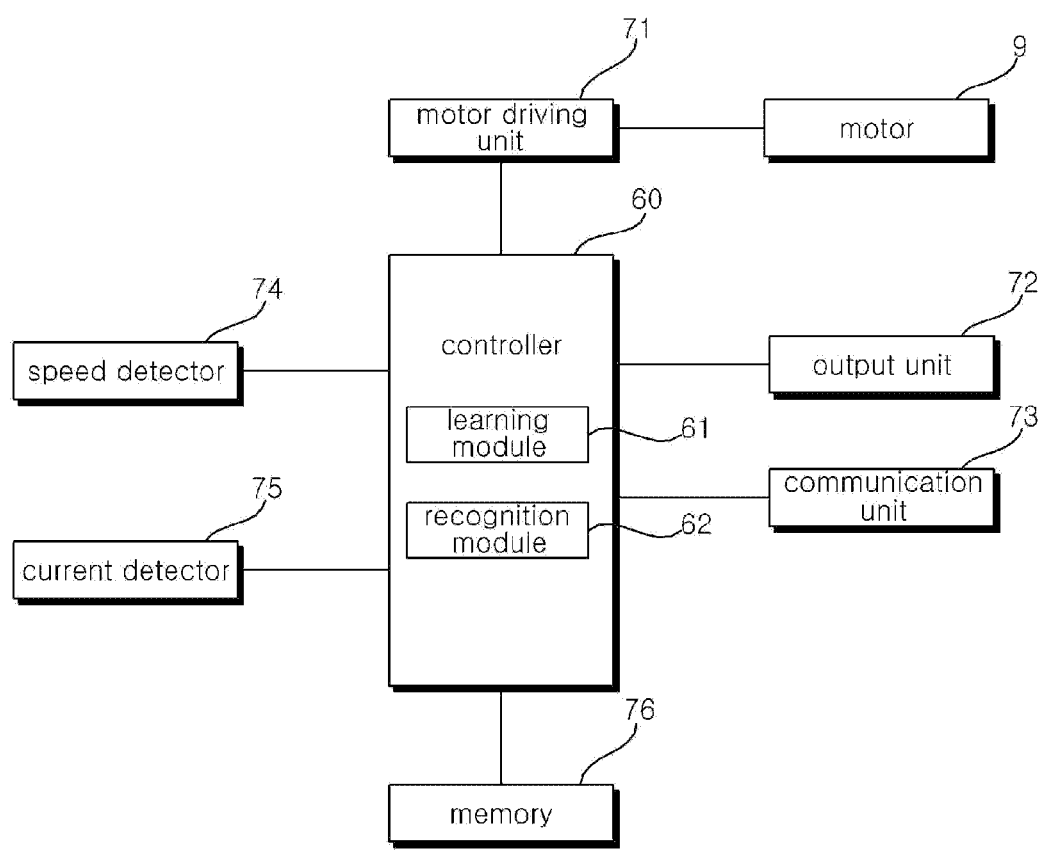
FIG. 2 is a block diagram showing a control relationship among main configurations of the laundry treating appliance of FIG. 1.

FIG. 1 is a lateral cross-sectional view showing a laundry treating appliance according to an exemplary embodiment of the present disclosure. FIG. 2 is a block diagram showing a control relationship among main configurations of the laundry treating appliance of FIG. 1.

Referring to FIG. 1, the laundry treating appliance according to an exemplary embodiment of the present disclosure includes a casing 1 forming an external appearance, a tub 3 containing washing water, a drum 4 disposed rotatably in the tub 3 and into which laundry is put and a motor 9 rotating the drum 4.

The drum 4 includes a front cover 41 having a opening through which laundry is put or withdrew, a drum 42 substantially disposed horizontally, the drum having a front end connected to the front cover 41, the drum having a shape of cylinder and a rear cover 43 connected to a rear end of the drum 42. A rotation axis of the motor 9 may be connected to the rear cover 43 in a state of penetrating a rear wall of the tub 3. A plurality of through holes may be formed at the drum 42 so that water can flows between the drum 4 and the tub 3.

There may be provided with a lifter 20 disposed at an inner circumference of the drum 42. The lifter 20 may be in a state of protruding from an inner circumference of the drum 42. Further, the lifter 20 may be extended in a longitudinal direction (e.g., forward and rearward directions) of the drum 42, and a plurality of lifters may be arranged in a radial direction in a state of being spaced from each other. When the drum 4 is rotated, the lifter 20 may cause a laundry to be supported so that it is spread.

A height that the lifter 20 is protruded from the drum 42 may be less than 40 mm, but it is not limited thereto. When the height is 40 mm, laundry is clung to the drum 4 during a rotation of the drum 40 at around a speed of 60 rpm. That is, in a state that the drum 4 spins over one revolution by speed of 60 rpm, even if laundry placed at the lowest side in the drum 4 is rose to the maximum height by rotation of the drum 4, the laundry is rotated together with the drum 4 without dropping laundry. (filtration motion)

Meanwhile, when a height of the lifter 20 is less than 20 mm, (it may also include a case that a height of the lifter is zero, and in other words, a case that the lifter 20 is not exist) even if the drum 4 is continuously rotated by around a speed of 80 rpm, laundry is not clung to the drum 4. Thus, during a rotation of the drum 4 more than one revolution in one way, laundry placed at the lowest side in the drum 4 is rose to a height and then descends in a state of being separated from the drum 4. Herein, in a case that the drum 4 rotates by a speed from 80 rpm to 100 rpm, the filtration motion can be realized.

The drum 4 rotates in reference to a horizontal axis. In this case, "horizontal" does not mean strictly geometric horizontal. In other words, as shown in FIG. 1, while the drum 4 is disposed inclined with respect to the geometric horizontal direction, but it can merely be understood that the drum 4 is close to horizontal rather than vertical. So, it can be understood that the drum 4 rotates in reference to a horizontal axis.

A laundry insertion port is formed at a front surface of the casing 1, and a door 2 opening or closing the laundry insertion port is disposed rotatably at the casing 1. A water supply valve 5, a water supply passage 5 and water supply hose 8 may be installed in the casing 1. When the water supply valve 5 is opened to supply water, washing water passed through the water supply passage 5 is mixed with detergent in a dispenser 14, and then is supplied to a tub 3 via the water supply hose 8.

An inlet port of a pump 11 is connected to the tub 3 through a discharge hose 10, and an outlet port of the pump 11 is connected to a discharge passage 12. Water that is flowed through the discharge hose 10 and discharged from the tub 3 is pressurizedly transferred to a drain passage 12, and then is discharged outside the laundry treating appliance.

Referring to FIG. 2, the laundry treating appliance according to an exemplary embodiment of the present disclosure may include a controller 60 controlling overall operation in the laundry treating appliance, a motor driving section 71, a output section 72, a communication section 73, a speed detector 74, a current detector 75 and a memory 76.

The controller 60 is able to control overall processes in washing, rinsing, dehydration and drying. The controller 60 is able to proceed in washing, rinsing, administrating according to a predetermined algorithm. Further, the controller 60 is able to control the motor driving section 71 according to the algorithm.

The motor driving section 71 is able to control operation of the motor 9 according to a control signal transmitted from the controller 60. The control signal may be a signal controlling a target speed, an acceleration slope (also known as acceleration), an operation time, and so on.

The motor driving section 71 functions to operate the motor 9. The motor driving section 71 may include an inverter (not shown) and an inverter controller (not shown). Further, the motor driving section 71 may further a converter supplying direct current power to the inverter.

For example, when the inverter controller (not shown) outputs a switching control signal in pulse width modulation to the inverter (not shown), the inverter (not shown) may execute high-speed switching motion so as to supply an alternating current power of a specific frequency to the motor 9.

The speed detector 74 detects a rotation speed of the drum 4. The speed detector 74 is able to detect a rotation speed of a rotator in the motor 9. In a case of employing planetary gear trains rotating the drum 4 by converting rotation ratio of the motor 9, a rotation speed of the drum 4 may be a value that a rotation speed detected by the speed detector 74 is converted to a value taken account into decreasing speed or increasing speed of the planetary gear trains.

The controller 60 is able to control the motor driving section 71 so that the motor 9 follows a predetermined target speed while getting a current speed transmitted from the speed detector 74.

The current detector 75 is able to detect electric current (hereinafter it is called current) transferred by the motor 9 and to transfer the electric current to the controller 60, and the controller 60 is able to detect characteristic and amount of laundry using electric current as input data. At this time, the current values as the input data include values obtained while the motor 9 is accelerating to the predetermined target speed.

In a case that a rotation of the motor 9 is controlled by a vector control based on a torque current and a magnetic flux current, the current may be a component for torque axis (q-axis) of the current flowing through a motor circuit, and in other words it may be torque current Iq.

The output section 72 functions to output operation status of the laundry treating appliance. The output section 72 may be video output devices such as LCD, LED, and so on for outputting visual displays, or audio output devices such as speaker buzzer, and so on for outputting sound. The output section 72 is able to output information about amount and characteristic of laundry according to a control of the controller 60.

Artificial neural network programmed, current patterns (learning data of machine learning) obtained while accelerating the motor 9, data base DB established by machine learning based on the current patterns, machine learning algorithm, current value detected by the current detector 75, value that the current values are averaged, a value that the averaged value is treated according to parsing rule and data transmitted through the communication section 73, etc. may be stored in the memory 76.

In addition, various control data for controlling overall operation in the laundry treating appliance, predetermined washing data inputted by a user, washing time calculated according to the predetermined washing data, data about washing course, etc., and data for determining whether error is occurred in the laundry treating appliance, or something may be stored in the memory 76.

The communication section 73 may communicate with servers connected to the network. The communication section 73 may include at least one or more communication modules such as internet module, mobile communication module, and so on. The communication section 73 is able to receive learning data, various data such as algorithm update and so on from the servers.

The controller 60 may treat various data received from the communication section 73 so as to renew the memory 76. For example, in a case that data inputted from the communication section 73 is update data about drive program stored in the memory 76, it can be updated in the memory 76. In a case that the inputted data is new drive program, it can be additionally stored in the memory 76.

Meanwhile, flow type in the drum 4 may be motions such as rolling, tumbling and filtration. Hereinafter, referring to FIG. 13, operating motion of the drum realized in the motions will be described.

Figure 13:
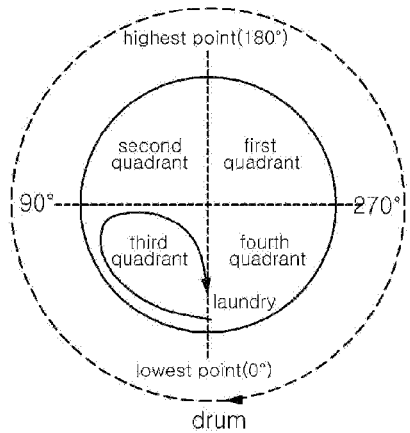
FIG. 13 is schematic view showing a flow of laundry in rolling, tumbling and filtration motions.
Figure 13:
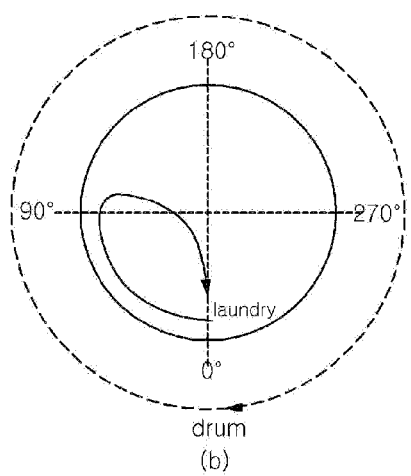
Figure 13:
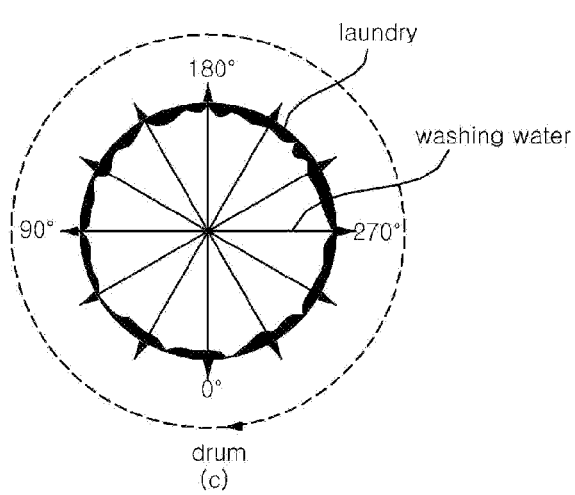

Referring to (a) of FIG. 13, the rolling motion means that the motor 9 rotates the drum 4 in a direction (preferably more than one revolution), and further means that laundry placed in an inner circumference of the drum 4 is controlled to be descended at a position of less than 90 degrees with respect to a rotation direction of the drum 4.

For example, when the drum 4 is rotated at about 40 rpm, laundry placed at the lowest point of the drum 42 rises to a certain height along a rotation direction of the drum 4, and then moves toward the lowest point as if rolling from the lowest point of the drum 42 in a certain position of less than 90 degrees. That is, it seems like laundry is continuously rolled at the third quadrant in the drum 4 while the drum 4 is rotated in clockwise.

In rolling motion, the laundry is washed through friction with the washing water, friction between the laundry, and friction with the inner surface of the drum 4. Herein, there is enough inversion of the laundry to give it the effect of gently rubbing it.

Herein, a rotation speed of the drum 4 is determined by a relationship with a radius of the drum 4. The greater the rotation speed of the drum 4, the greater the centrifugal force exerting on laundry inside the drum 4. The difference between a centrifugal force and gravity changes a flow of laundry inside the drum 4. At this time, a friction between a rotation force of the drum 4 and the laundry and a force of the lifter 45 lifting laundry should be considered together. A rotation speed of the drum 4 in rolling motion is determined in a range that the sum of the forces exerted to the laundry, including centrifugal force and friction force, is less than the gravity 1G.

(b) of FIG. 13 shows tumbling motion. Tumbling motion is a motion in which the motor 9 rotates the drum 4 in one direction (more than one revolution, preferably) but is controlled so that laundry on an inner circumference of the drum 4 falls to the lowest point of the drum 42 at a position from about 90 degrees to 110 degrees with respect to a rotating direction of the drum 4. Tumbling motion is a drive motion commonly used for washing and rinsing because mechanical force is generated only by controlling the drum 4 to rotate in one direction at an appropriate rotation speed.

Laundry put into the drum 4 is placed at the lowest point of the drum 42 before the motor 9 is driven. When the motor 9 provides torque to the drum 4, the drum 4 is rotated, and the laundry is rose from the lowest point by a force of the lifter 45 mounted on the inner surface of the drum 4 or a friction with an inner surface of the drum 4. For example, if the motor 9 rotates the drum 4 at about 46 rpm, the laundry is fallen from the lowest point of the drum 42 in a direction of rotation at about 90 to 110 degrees.

A rotation speed of the drum 4 in tumbling motion can be determined within a range where centrifugal force is greater than that of rolling motion, but less than gravity.

Visually, when the drum 4 rotates in clockwise, the drum rises to 90 degrees or second quadrant position from the lowest point of the drum 42, then falls apart into the inner surface of the drum 4.

Thus, in tumbling motion, laundry is laundered by the force of impact caused by friction with the washing water and falling, especially by a greater mechanical force than in the case of rolling motion. In particular, tumbling motion has an effect of loosening tangled laundry and dispersing laundry.

(c) of FIG. 13 shows the filtration motion. Filtration motion is a motion in which the motor 9 rotates the drum 4 so that the laundry does not fall off inside surface of the drum 4 by centrifugal force. By filtration motion, a surface area of the laundry is enlarged, while the washing water penetrates laundry, so it is a suitable motion for rinse.

The flow characteristics of laundry must be taken into account in order for the flow patterns of various laundry products, such as the above, to be implemented as previously established. In this case, the above flow characteristics are not limited to the volume, but are generally affected by a number of parameters, such as the foam and the volume of laundry. In particular, since the above flow characteristics are difficult to quantify, it was not easy to control a rotation of the drum by reflecting these flow characteristics in the past.

According to an exemplary embodiment of the present disclosure, the controller 60 controls the motor 9 so that the drum 4 rotates at an accelerated speed, and function of current change is obtained based on an current detected by the current detector 75 during the accelerating rotation of the drum 4.

Specifically, the controller 60 controls the motor 9 so that the drum 4 rotates rapidly. At this time, the controller 60 may control the motor 9 to be accelerated from a first rotation speed V1 to a second rotation speed V2. The first rotation speed V1 may be the specified value in a range 10 rpm to 20 rpm. The second rotation speed V2 may be the specified value in a range at 80 rpm to 100 rpm. At this time, the motor 9 can be accelerated to a predetermined constant acceleration speed, and the above acceleration is in a range from 1.5 rpm/s to 2.5 rpm/s and preferably 2.0 rpm/s.

Figure 4:
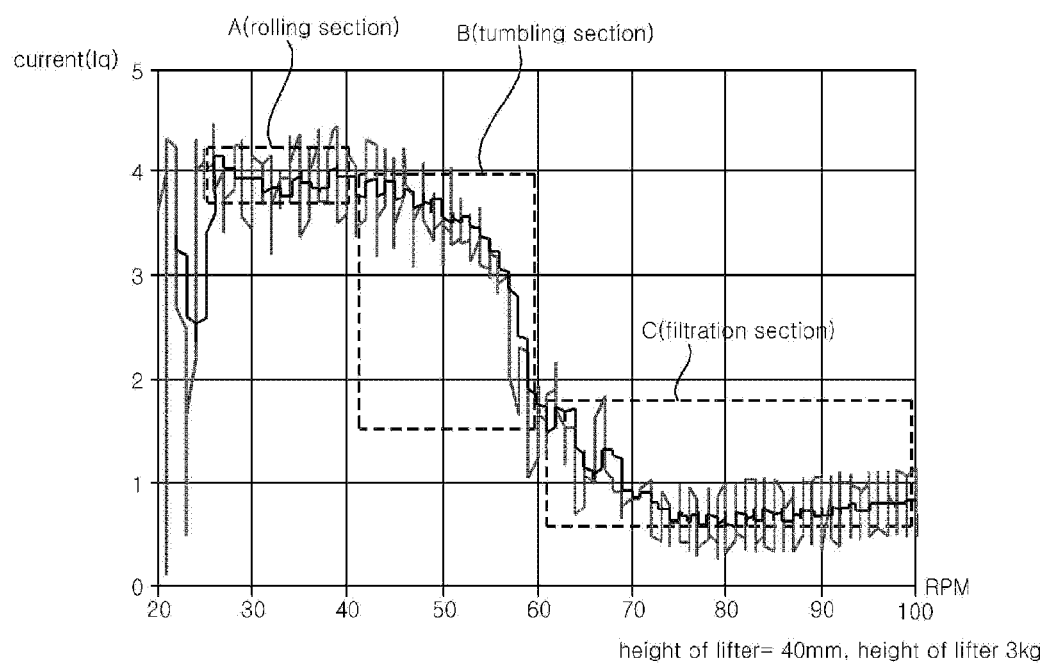
FIG. 4 is a graph indicating an electric current pattern detected while controlling a speed of the motor in a predetermined manner.
Figure 5:
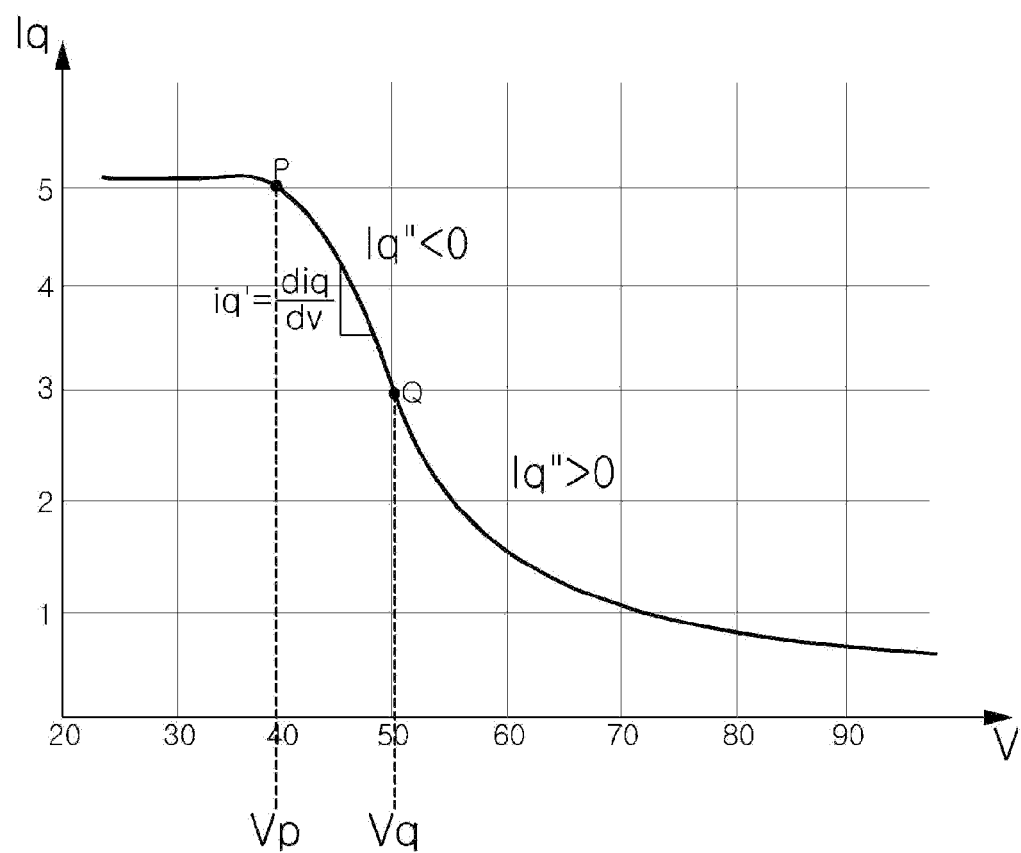
FIG. 5 is a graph indicating a function of current change obtained from the electric current pattern of FIG. 4.

Subsequently, the controller 60 can obtain a function of current change as shown in FIG. 5 using the current pattern detected as shown in FIG. 4. The current pattern detected above is the connection of the current values iq obtained at regular intervals, whereas the function of current change may be a continuous function obtained from the current values. For example, the controller 60 may interpolate the interval between the current values obtained by the current detector 75 (undetected section of current) at a given period of time so as to obtain a continuous function. The interpolation may be performed by various manners known as statistical techniques. For example, the interpolation may include a process of assuming values between discrete current values, taking into account several factors, such as the mean value, deviation, etc.

Meanwhile, in the process of obtaining the function of current change, the controller 60 may exclude any of the current values iq obtained from a certain section. For example, as shown in FIG. 4, in the initial section from the beginning of an acceleration of the drum 4 to a certain period of time, the current value iq obtained from the period of time should be excluded from the process of obtaining the function, as the system has not yet stabilized and therefore fluctuates heavily in the current value iq.

The controller 60 may set a first motion speed based on the reduction value of the first derivative of the function of current change. The function of current change, in which the function value (current value) gradually decreases as the speed of the drum 4 increases, is negative (iq'<0) for the graph slope (i.e., first derivative iq').

In particular, when the rotation speed of the motor 9 is gradually increased and reached a specified speed, the first derivative is rapidly decreased (herein, the first derivative is negative, so the absolute value is rapidly increased). The controller 60 detects this point and sets the first motion speed based on this point and the corresponding speed.

The first motion speed may be set based on a rotation speed Vp of the motor 9 corresponding to a predetermined value when the first derivative iq' is decreased and is less than the predetermined value (hereinafter referred to as the setting=−d*, d*00). A rotation speed p of the motor 9 corresponding to the predetermined value may be in a range between 10 rpm and 40 rpm.

The controller 60 may set the first motion speed to a value below the predetermined value Vp. In the section in which the drum 4 is rotated below the predetermined value Vp, the flow of laundry (i.e., laundry placed on the inner surface of the drum 42 at the lowest point of the drum 42) is highly correlated with a rolling motion type. Therefore, in a case that the first motion speed is set below the predetermined value Vp and the motor 9 is rotated at a predetermined speed, the laundry may be similar to that of the rolling motion. In other words, when the motor 9 is rotated at the first motion speed, laundry in the drum 4 may rise and fall to a certain position less than 90 degrees in a rotation direction of the drum 4 repeatedly.

Herein, the first motion speed may be the predetermined speed to control the drum 4 with rolling motion after subsequent administrations such as washing, rinsing and dehydration, and the predetermined value Vp may be the maximum.

Meanwhile, the controller 60 can obtain an inflection point Q at which the value of the second derivative iq" in the current change graph changes from negative (−, or concave) to positive (+, or convex) while the drum 4 is accelerating beyond a rotation speed of the motor 9 corresponding to the predetermined value Vp.

Herein, a predetermined rotation speed Vq corresponding to the inflection point iq" corresponds to the upper limit on which the tumbling motion is maintained, and when the motor 9 exceeds the rotation speed Vq, it is considered that the filtration motion is caused from then on.

The controller 60 can set a second motion speed based on a rotation speed of the motor 9 corresponding to the inflection point Q. The rotation speed Vq of the motor 9 corresponding to the inflection point Q may be in a range between 40 rpm and 60 rpm.

The controller 60 can set the secondary motion speed to a value below the rotation speed Vq. In the section in which the drum 4 rotates below the rotation speed Vq, a flow of laundry (i.e., laundry on the surface of the drum 42 at the lowest point of the drum 42 is highly correlated with the form of the tumbling motion.

Rotating the motor 9 at the second motion speed may be performed in the tumbling motion. In the tumbling motion, laundry in the drum 4 may rise and fall to certain position less than 90 to 110 degrees in a rotating direction of the drum 4.

Meanwhile, the controller 60 may control the motor 9 to rotate at the first motion speed, then stop the motor 9, and the motor 9 to rotate at the second motion speed.

Hereinafter, referring to FIG. 6 to FIG. 13, laundry treating appliance according to the other exemplary embodiment of the present disclosure will be described.

Machine learning means that the computer learns through data without directly getting logic from a user, whereby the computer solves the problem on its own.

Deep Learning is an artificial intelligence technology that teaches computers human thinking based on artificial neural network ANN to construct artificial intelligence. And the deep learning is technology allowing computers to learn as humans themselves without having to teach them. Artificial neural network ANN can be implemented in the form of software or hardware such as chips.

The laundry treating appliance can handle current values detected by the current detector 75 based on machine learning to identify the characteristics of laundry put into the drum. This type of laundry characteristic is an example of the type of laundry flow caused by a rotation of the drum 4.

The method of controlling the laundry treating appliance according to an exemplary embodiment of the present disclosure is to set the rotation speed (i.e., the motion speed) of the drum 4 in drive motions (rolling, tumbling, filtration motion, etc.) according to the flow characteristics of laundry in the drum 4 using the artificial neural network learned by machine learning.

Specifically, the controller 60 controls the motor 9 so that the drum 4 rotates rapidly. At this time, the controller 60 can be controlled so that the motor 9 is accelerated from the first rotation speed V1 to the second rotation speed V2. The first rotation speed V1 may be the specified value in a range at 10 rpm to 20 rpm. The second rotation speed V2 may be the specified value in a range at 80 rpm to 100 rpm.

At this time, the motor 9 can be accelerated to a predetermined acceleration speed, and the predetermined acceleration speed is in a range from 1.5 rpm/s to 2.5 rpm/s and preferably 2.0 rpm/s.

The controller 60 sets a motion speed Vc of the drum 4 in a drive motion set corresponding to a decision section based on the current value detected by the current detector 75 in the decision section while the drum 4 is rotating at an accelerated speed. (i.e., the motor 9 is accelerating from the first rotation speed V1 to the second rotation speed V2)

The controller 60 can obtain the motion speed Vc by inputting a current value obtained from the decision section into the input layer and by outputting the inputted current to an output layer of the artificial neural network, wherein the artificial neural network is previously learned by the machine learning.

Based on the speed values detected by the speed detector 74, the controller 60 selects the current value of the motor 9 of the current values obtained by the current detector 75 corresponding to the decision section, and the selected current value can be used as the input for the input layer.

Herein, the decision section may be one of the first section A, the second section B and the third section C got in a section in which a speed of the motor 9 is increased. The drum drive motion may be determined as a rolling motion in response to the first speed section A, as a tumbling motion in response to the second speed section B, and as a filtration motion in response to the third speed section C.

In other words, when a current value obtained from the first speed section A, a current value obtained from the second speed section B, and a current value obtained from the third speed section C are inputted as an input of the input layer of the artificial neural network, a rotation speed of the drum 4 in rolling motion, a rotation speed of the laundry 4 in tumbling motion and a rotation speed of the laundry 4 in filtration motion are obtained as an output of the output layer of the artificial neural network.

The first speed section A may be included in a section from a first rotation speed V1 to 40 rpm. In a section in which the drum 4 is rotated below 40 rpm, the flow of laundry (i.e., laundry placed on an inner surface of the drum 42 at the lowest point of the drum 42) is highly correlated with the type of the rolling motion. Therefore, it is desirable to use a current value obtained in the first speed section A as an input data to optimally set the motion speed in the rolling motion that is subsequently performed.

The second speed section B may be included in a section ranged from 40 rpm to 60 rpm. In a section in which the drum 4 rotates in a rotation speed ranged from 40 rpm to 60 rpm, the flow of laundry (i.e., laundry placed on an inner surface of the drum 42 at the lowest point of the drum 42) is highly correlated with type of the filtration motion. Therefore, it is desirable to use a current value obtained in the second speed section B as an input data to optimally set the motion speed in the filtration motion that is subsequently performed.

The third speed section C may be included in a section ranged from 80 rpm to 100 rpm. In a section in which the drum 4 rotates in a rotation speed ranged from 80 to 100 rpm or less, flow of laundry (i.e., laundry placed on an inner surface of the drum 42 at the lowest point of the drum 42) is highly correlated with type of the tumbling motion. Therefore, it is desirable to use a current value obtained in the second speed section B as an input data to optimally set the motion speed in the tumbling motion that is subsequently performed.

Figure 3:
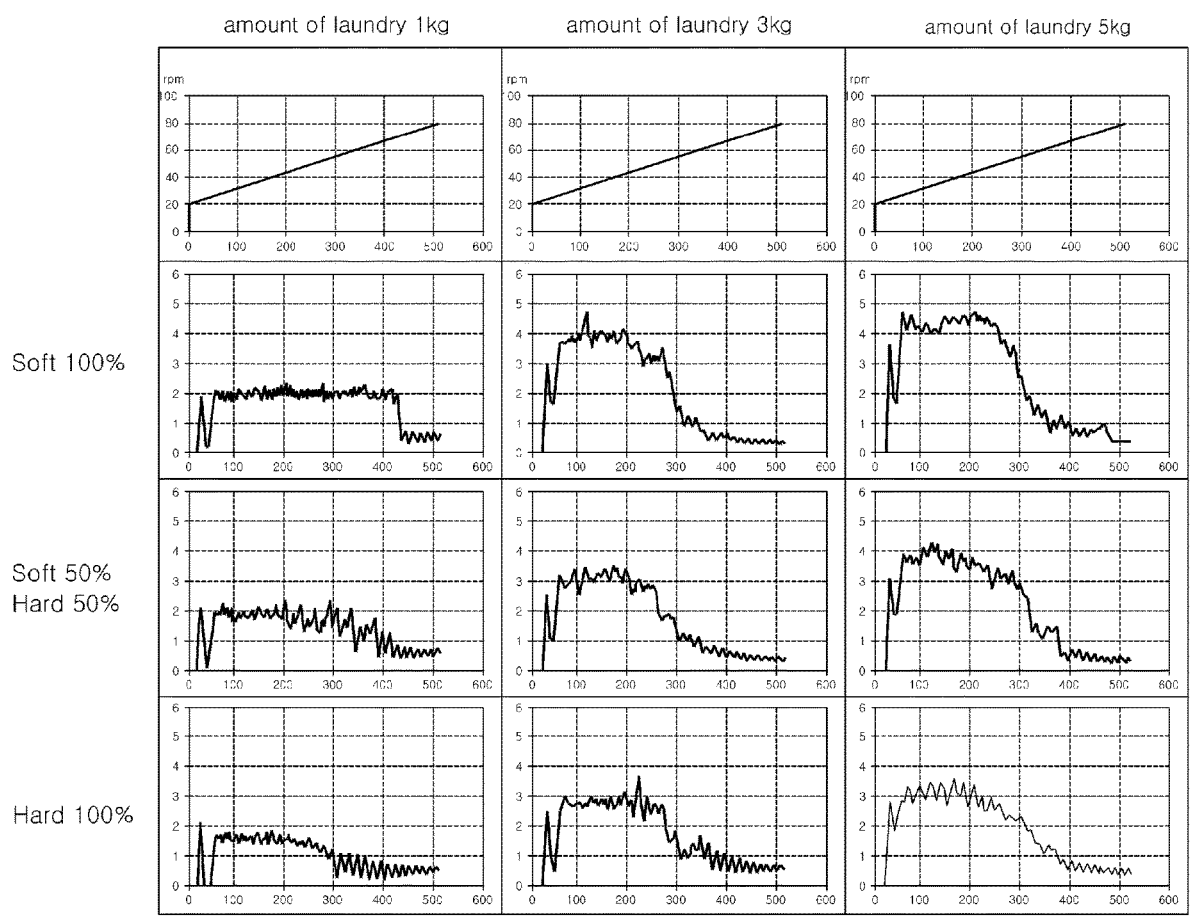
FIG. 3 is a graph indicating an electric current pattern allowed to a motor according to characteristic of laundry and amount thereof.

Meanwhile, each graph shown in FIG. 3 indicates a current detected while accelerating the drum 4 to a predetermined target speed (e.g., 80 rpm), which is detected with different loads from the characteristic of laundry (i.e., the mixture ratio of soft and stiff laundry). In other words, horizontally arranged graphs allow us to identify the variation in patterns according to a load of laundry. For example, in the same laundry configuration, the higher the load, the greater the maximum current value at the beginning of the drum 4 accelerating. Graph shown in FIG. 3 indicates that a pattern is changed per differential amount of laundry or configuration of laundry, but similarities in the overall shape are maintained. Thus, in any case, the first speed section A of the drum 4, fluctuates within certain range at a great value, and then drops sharply in the second speed section B, and in the third speed section C, departs within certain range at a small value again.

As seen from the foregoing, the graphs have a correlation even if the composition or volume of laundry varies, but there is a difference between the graphs in their detailed form. In particular, the graphs show that the current pattern is different, even if the load is the same when the configuration of the laundry changes.

Therefore, the current values obtained in one section of the first to third speed sections A, B, C reflect an amount and configuration of laundry along with the flow characteristics (i.e., rolling, tumbling, or filtration) of the laundry corresponded thereto The graph of FIG. 3 shows that the current value rises overally rapidly to certain level at the beginning of the acceleration of the drum 4 and then the current value converges certain value the latter half.

The controller 60 may include a learning module 61 and a recognition module 62. The learning module 61 is able to perform machine learning using the current value detected by the current detector 75 or a value by which the current value is treated. Through the machine learning, the learning module 61 is able to update the data base stored in the memory 76.

As a learning method for the learning module 61, it can be used for one of unsupervised learning and supervised learning.

The recognition module 62 is able to set the motion speed based on data learned by the learning module 61. According to an exemplary embodiment of the present disclosure, the motion speed can be classified into three Vc1, Vc2, Vc3 but are not necessarily limited thereto.

The recognition module 62 may include artificial neural network ANN that have been learned through machine learning. The artificial neural network can be updated by the learning module 61.

The recognition module 62 may include deep neural network DNN such as convolutional neural network CNN which is learned by deep learning, recurrent neural network RNN, and deep belief network DBN, etc.

The recurrent neural network RNN is commonly used in natural language processing and so on, and it can be constructed by stacking layers at every moment as a structure having a benefit of processing time-series data changing according to passage of time.

The deep believe network DBN is a deep learning structure that consists of multiple layers of restricted boltzman machine RBM, a deep learning technique. By repeatedly learning the restricted boltzman machine RBM, the deep belf network DBN having the number of layer corresponded thereto in a case that certain number of layer is stacked is formed.

Convolutional Neural Network is a model imitating a person's brain function based on the assumption that when a person recognizes an object, he or she extracts the basic features of an object, then performs complex calculation in the brain, and then recognizes the object based on the result.

Meanwhile, learn of artificial neural network can be accomplished by adjusting the weight of the connection lines between nodes (and, if necessary, adjusting the bias value) in order to produce a desired output for a given input. The artificial neural network can continuously update weight values by learning. Methods such as back propagation can be used to learn of artificial neural network.

Figure 7:
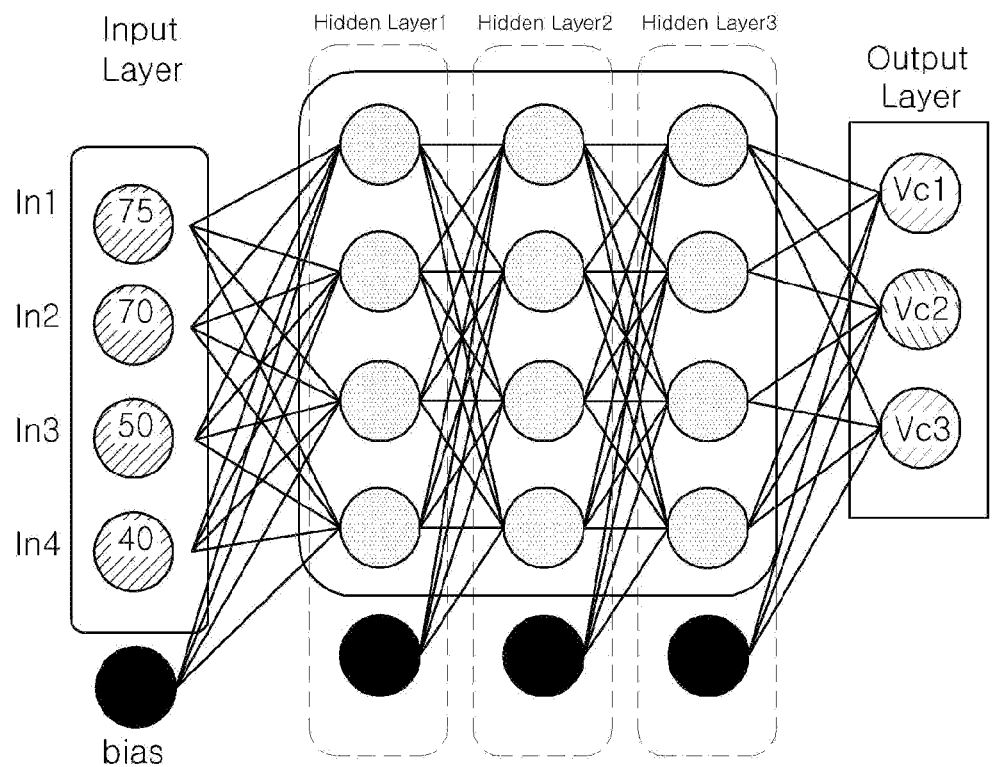
FIG. 7 is a schematic view showing an artificial neural network.

Referring to FIG. 7, the recognition module 62 can obtain the motion control velocity Vc from the output layer based on the current value as input data In1, In2, In3, In4 of the input layer, and on the basis of weights between nodes contained in the deep neural network DNN.

Figure 6:
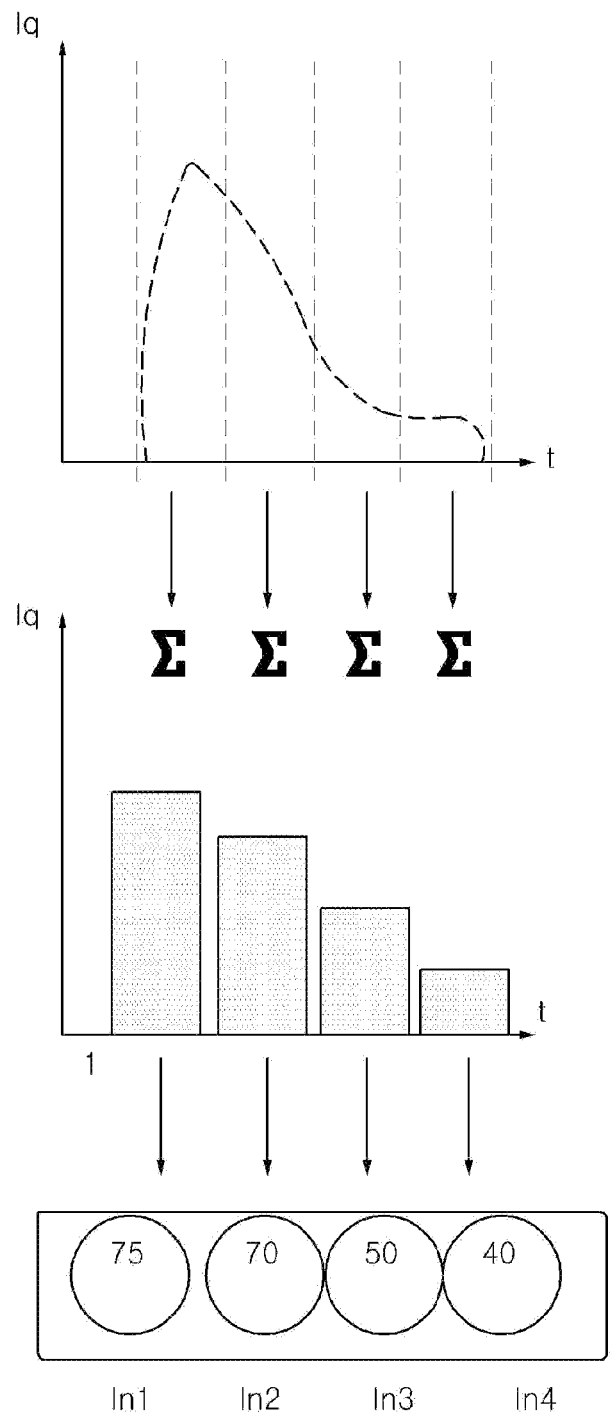
FIG. 6 is a schematic view showing a process of treating electric current value obtained by a current detector as input data of artificial neural network according to the other exemplary embodiment of the present disclosure.
Figure 8:
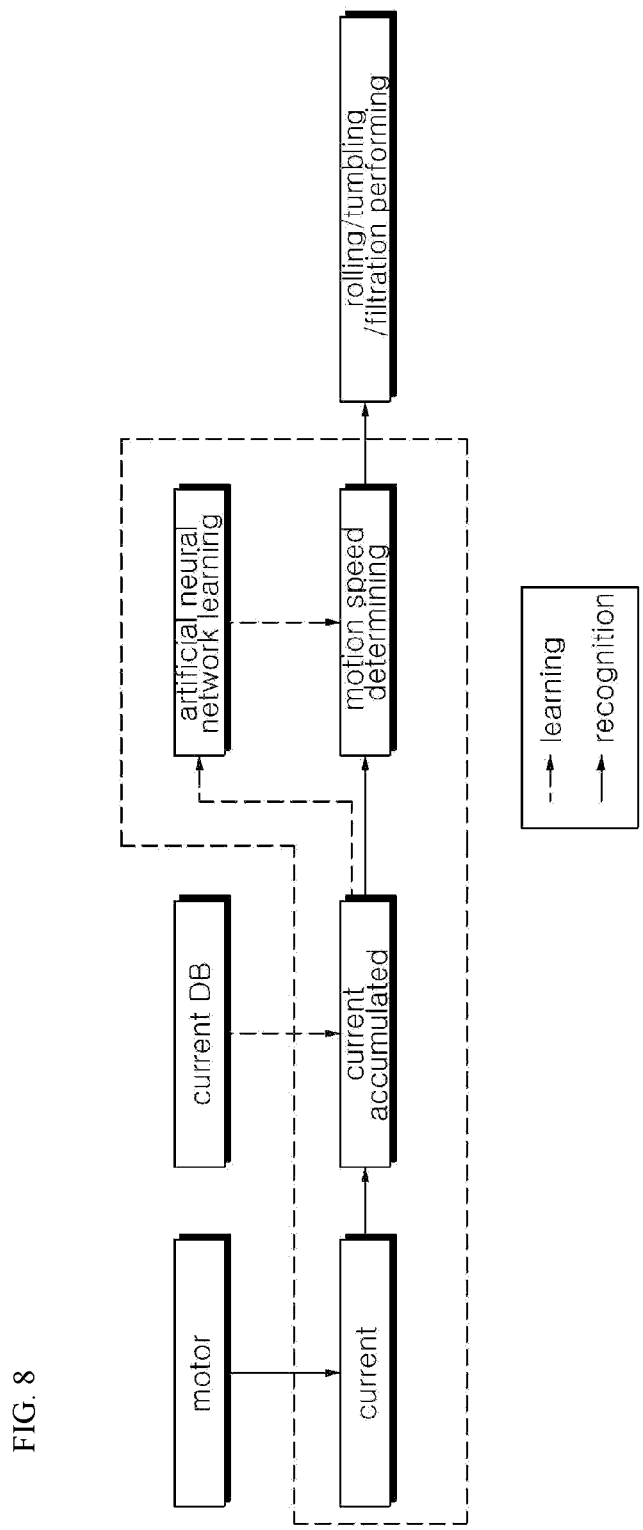
FIG. 8 is a block diagram showing dividing a process of determining characteristic per laundry using electric current value of the motor into learning process and recognizing process.

Referring to FIG. 6 to FIG. 8, deep learning technology, a type of machine learning, is based on data and learning deep into multiple levels.

Deep learning can represent a set of machine learning algorithms that extract core data from multiple data while computing on hidden layers one after another.

Deep learning structure can include artificial neural network ANN, for example, deep learning structure can consist of deep neural network DNN such as convolutional neural network CNN, recurrent neural network RNN, and deep belief network DBN.

Artificial neural network ANN can include input layers, hidden layers, and output layers. Having multiple hidden layers is called a Deep Neural Network DNN. Each layer contains a plurality of nodes, and each layer is associated with the next layer. Nodes can be connected to each other with weights.

Output from any node in a first hidden layer is inputted to at least one node in a second hidden layer. At this time, an input of each node may be a value with weight applied to an output of the nodes in the previous layer. Weight can mean connectivity strength between nodes. The deep learning process can also be seen as a process of finding the proper weight.

In order to better understand deep learning, looking at the well-known face recognition process, a computer can distinguish from input images, bright and dark pixels according to the brightness of the pixel, and simple forms such as borders and edges, and then distinguish objects from slightly more complex forms. Finally, computers can identify the form that defines the human face. As such, the embodiment of features (the regulation of the form of a human face) is finally obtained from the output layer through hidden layers in the middle layer.

The memory 76 can store input data for determining amount of laundry and data for learning deep neural network DNN. Data in that motor speed data and/or data acquired by a sensing section 150 is aggregated or computed per certain interval may be stored in the memory 76. In addition, Weights and biases forming in-depth neural network DNN may be stored in the memory 76.

Alternatively, according to an exemplary embodiment of the present disclosure, weights and biases forming structure of the in-depth neural network may be stored in an embedded memory of the recognition module 62.

Meanwhile, the learning module 61 can perform learning by using the current value detected through the sensing section 150 as training data. In other words, whenever the learning module 61 determines motion speed Vc, it can update structure of the deep neural network DNN, such as weight or bias, by adding the result of the judgment to the data base, or by performing the learning process with training data obtained after any number of training data is obtained, to update the structure of the deep neural network DNN such as weight.

The laundry treating appliance can transmit the speed data to a server (not shown) connected to the network through the communication section 73, and receive data related to machine learning from the server. In this case, the laundry treating appliance may update the artificial neural network based on data related to machine learning received from the server.

Figure 9:
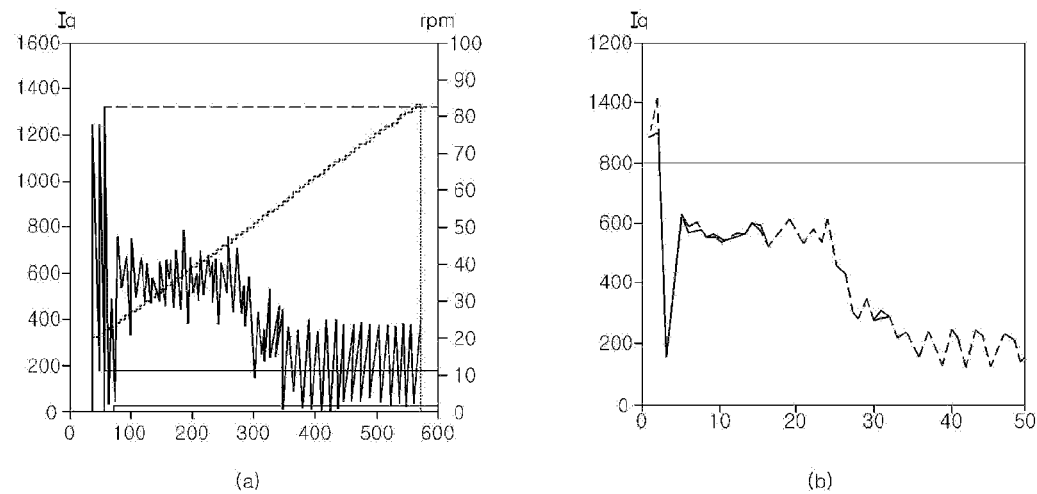
FIG. 9 is a graph (a) indicating an electric current value detected by the current detector and a graph (b) indicating an average value obtained by a treating moving average filter.
Figure 10:
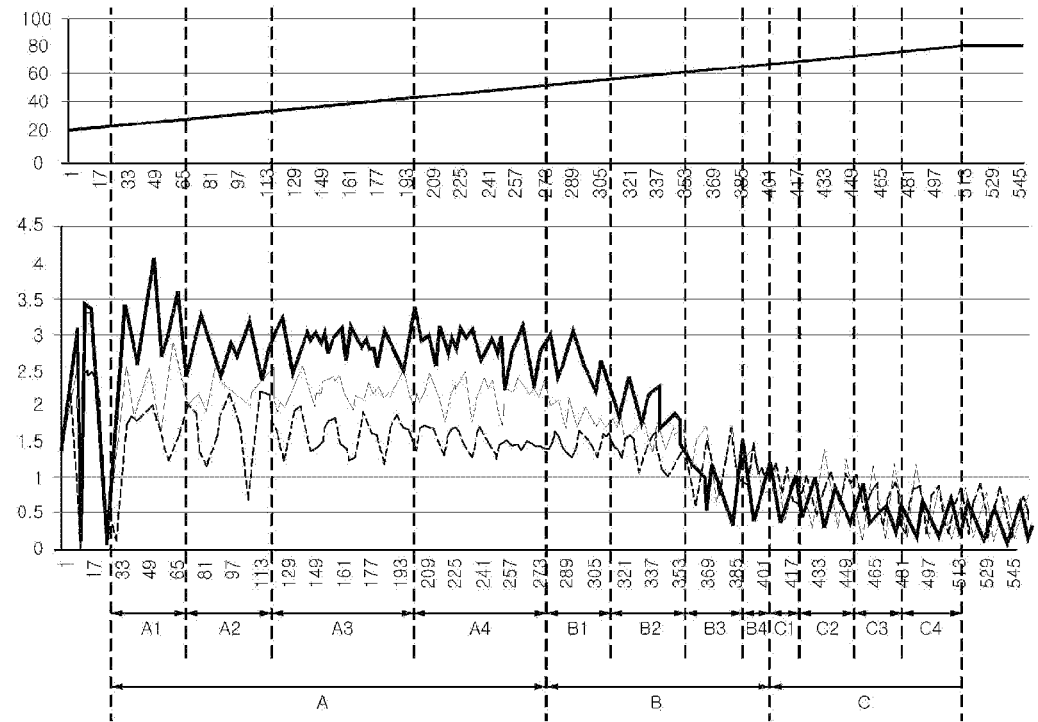
FIG. 10 is a graph indicating electric current values detected by the electric current detector.
Figure 11:
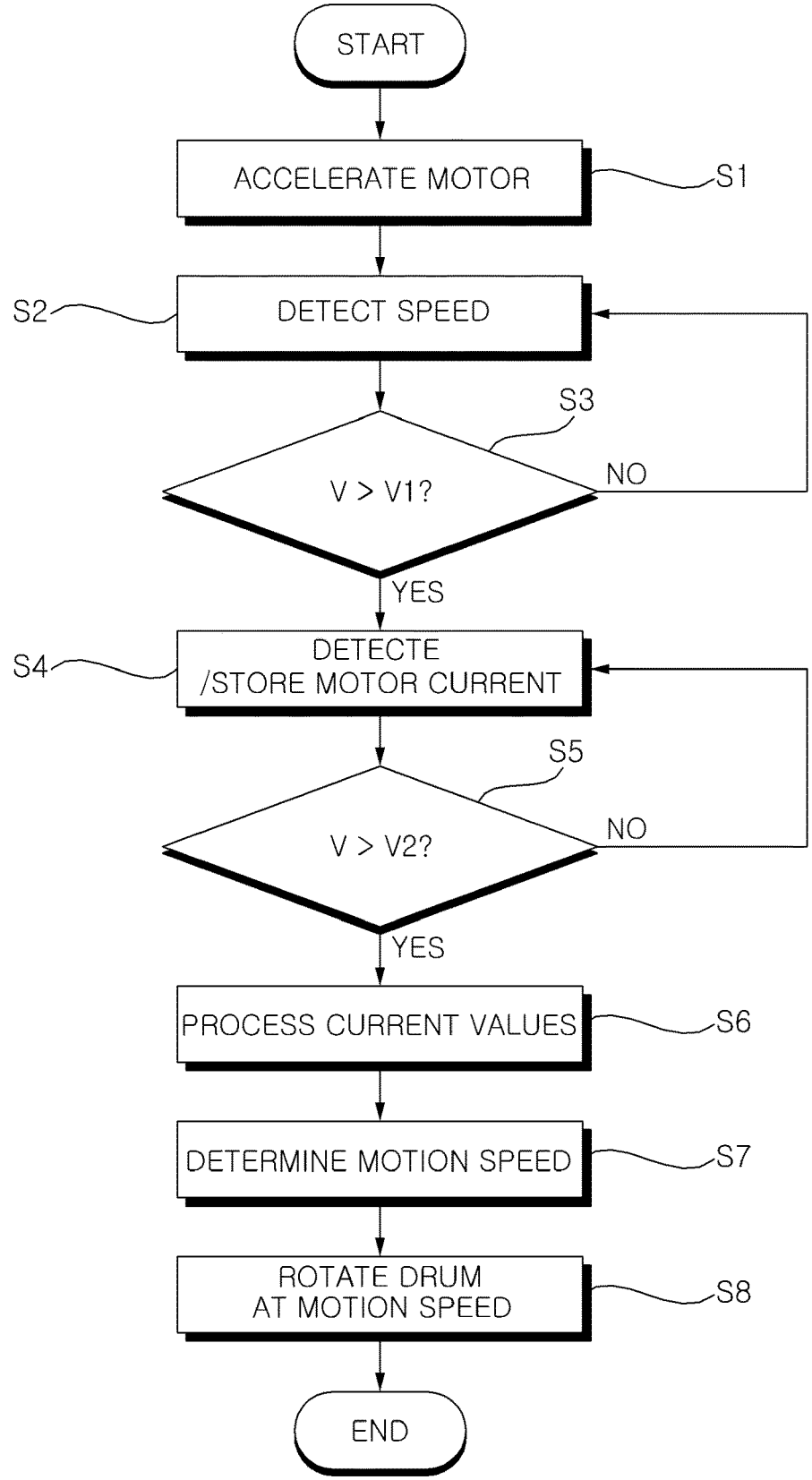
FIG. 11 is a flow chart showing a control method of the laundry treating appliance according to an exemplary embodiment of the present disclosure.
Figure 12:
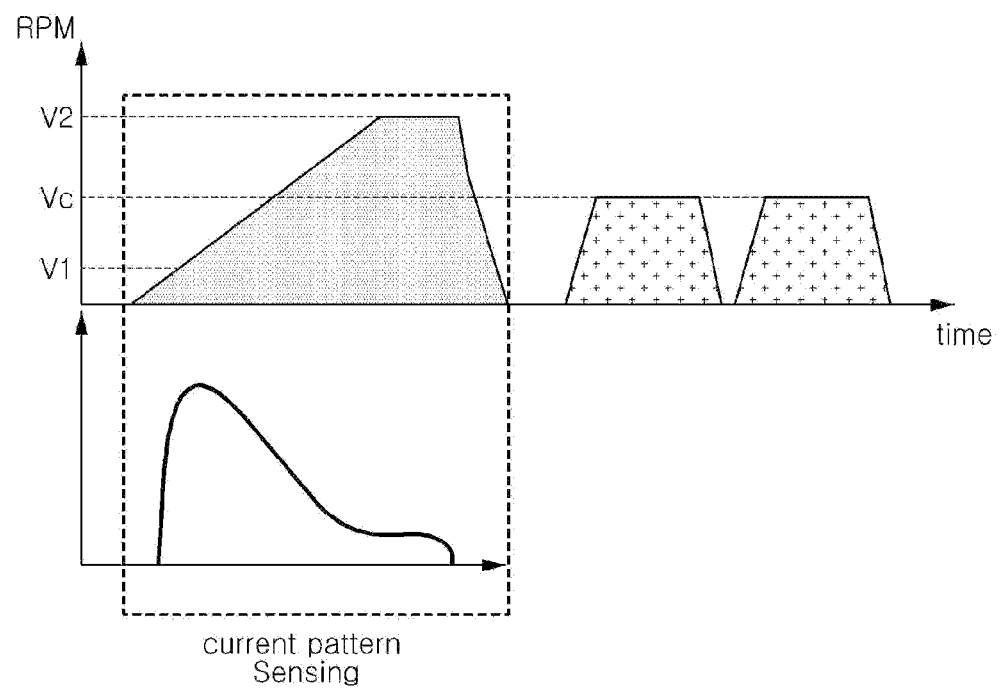
FIG. 12 is a graph indicating a rotation speed and an electric current pattern of the drum in related to a control method of the laundry treating appliance according to an exemplary embodiment of the present disclosure.

Referring to FIGS. 9 to 11, the controller 60 controls the motor 9 to rotate at the predetermined target speed V2. (S1, S2, S4, S5) While the motor is rotating, the rotation speed of the drum 4 (or motor 9) is detected by the speed detector 74. (S2)

The target speed may be determined by the rotation speed of the drum 4 which maintains the target speed and allows laundry to remain attached to the drum 42 when the drum 4 is rotated in one direction more than one revolution. The target speed V2 can be in a range from 80 rpm to 100 rpm, preferably 80 rpm.

Specifically, after the controller 60 instructs the motor driving section 71 to accelerate the motor 9, a current value at the time in memory 76 can be stored in the memory 76 when a rotation speed detected by the speed detector 74 reaches the first predetermined rotation speed V1. (S3 to S4) The first rotation speed V1 is in a range between 10 rpm and 20 rpm, preferably 20 rpm.

The step of S3 may be performed after the drum 4 is partially submerged in water by water supplied in the tub 3. That is, the step of S3 may be performed after water is supplied for wetting laundry. However, not limited thereto, the step of S3 may be performed in a state that the water in tub 3 is drained.

When the rotation speed V of the drum 4 reaches the second predetermined rotation speed V2, the controller 60 may be no longer store the current value and perform treating of the current value. (S5 to S6) Herein, the second rotation speed V2 may be the target speed.

Meanwhile, the acceleration slope from the first rotation speed V1 to the second rotation speed V2 may be constant. It is desirable that the acceleration slope remains constant in order to increase the reliability of detecting current pattern change.

The acceleration slope shall not be too high, so that the change in the flow of laundry in the drum 4 can be clearly seen. The acceleration slope may be preferably in a range from 1.5 rpm/s to 2.5 rpm/s, preferably 2.0 rpm/s, but not necessarily limited thereto. The acceleration slope may have as little value as possible to the extent that it can be controlled by the controller 60.

As shown in FIG. 6, treating of the current values is the process of generating input data (In1, In2, In3, In4) of the input layer of the artificial neural network by processing the current values Iq obtained from the predetermined points according to a predetermined algorithm S6.

This process may include a step of averaging current values Iq and a step of generating input data for the artificial neural network by processing average values obtained according to predetermined parsing rule. In particular, the number of input data processed by the predetermined parsing rule is less than the number of average values.

Referring to FIG. 9 to FIG. 10, the controller 60 may obtain current value at regular intervals through the current detector 75. According to an exemplary embodiment of the present disclosure, a total of 545 current values were obtained at a predetermined time interval in a section where the rotation speed of the drum 4 is accelerated from the first rotation speed V1 to the second rotation speed V2.

The current values obtained in this manner may be averaged over a predetermined period of time by the controller 60. At this time, the controller 60 may make the use of a moving average filter. The moving average is to calculate the mean by moving the section so that the changes in a trend can be seen. For example, supposing that current values are Iq1, Iq2, Iq3 . . . Iqn in a time series, M1 is obtained by averaging values from Iq1 to Iql(l<n), and M2 is obtained by averaging values from Iqm(m>1) to Iqm+s−1 (the number of Iq required for using to get each moving average). In this manner, the moving averages can be obtained by continuing to move sections.

By properly setting the time intervals in which the moving averages are obtained, the number of moving averages (M1, M2 . . . ) may be less than the total number of current Iq. However, the longer the length of the time interval, the lower the resolution for the current change trend, so the appropriate length of the time interval should be selected. According to an exemplary embodiment of the present disclosure, the controller 60 obtained fifty moving averages from 545 current values Iq using the moving average filter.

The controller 60 can generate input data (In1, In2, In3, In4 . . . ) by processing current values and the moving averages according to the predetermined parsing rule. The predetermined parsing rule may be structured to select the section where the final input data is obtained so that the characteristics (flow characteristics of laundry) are well displayed. According to an exemplary embodiment of the present disclosure, generating four input data for each speed interval (A, B, C), but it is not necessarily limited thereto. The input data may be the average value of the moving average belonging to each section by again dividing each speed sections A, B, C into four sections {A1, A2, A3, A4}, (B1, B2, B3, B4) and (C1, C2, C3, C4). The input data In1, In2, In3, In4 obtained becomes an input value of each node in the input layer.

Weight and bias assigned to the nodes forming the artificial neural network are defined by machine learning, which is repeated based on current patterns or current values. In addition, the current pattern (or current value) reflects flow characteristics of laundry as described above, so it is possible to set improved or accurate weights and deflections by performing machine learning of data added by the previously stored or by the operation of laundry treating appliance until an accurate result (i.e., accurate flow characteristics of laundry currently put into the drum 4) is obtained.

In the artificial neural network built in this manner, an output of the output layer will reflect flow characteristics of the laundry and the controller 60 may determine the motion speed Vc based on a node that outputs the greatest value among the nodes in the output layer. (S7)

Subsequently, the controller 60 may control operation of the drum 4 according to the motion speed Vc determined in the step S7. (S8). Motion speed Vc in rolling motion, tumbling motion, and filtration motion may be set according to the current value inputted in the input layer of the artificial neural network. At this time, if all the current values obtained from the first speed section A, second speed section B and third speed section C are inputted to the input layer, motion speed Vc in the rolling motion, tumbling motion, and the filtration motion may all be output from the output layer of the artificial neural network. In this case, the controller 60 may respectively set the motion speed Vc in the rolling motion stored in the memory 76, the motion speed in the tumbling motion stored in the memory 76 and the motion speed in the filtration motion stored in the memory according to values outputted in the output layer.

The motion speed Vc may be updated repeatedly or periodically. In other words, a series of steps from the step of S1 to the step of S7 may be repeated during operation of the laundry treating appliance, referring to FIG. 11, and at each iteration, the controller 60 may update the previous value of the motion speed Vc to the motion speed Vc newly obtained from the step of S7.

The above example is the front load method in which the drum 4 rotates on a substantially horizontal axis, but the laundry treating appliance and method for controlling the same can also be applied to a top load method.

In the meantime, according to an exemplary embodiment of the present disclosure, it is possible to realize a code that the processor can read based on record media that the processor can read. The record media that a processor can read includes all kinds of record devices where data that can be read by the processor is stored. As an example of the record media that a processor can read include ROM, RAM, CD-ROM, a magnetic tape, a floppy disk, an optical data storage, etc. Further, a type of carrier waves such as transmission over the Internet can be included therein. In addition, the record media that the processor can read can be distributed over networked computer systems, allowing the processor to store and execute code that can be read by the processor in a distribution manner.

Although the embodiments of the present disclosure are described above with reference to the accompanying drawings, the present disclosure is not limited to the above embodiments, and may be manufactured in various forms, and in the art to which the present disclosure belongs, those skilled in the art will appreciate that the present disclosure may be embodied in other specific forms without changing the technical spirit or essential features of the present disclosure. Therefore, it should be understood that the embodiments described above are exemplary in all respects and not restrictive.

The invention claimed is:

1. A laundry treating appliance comprising:
a drum configured to receive laundry;
a motor rotating the drum;
a detector detecting a current of the motor; and
a controller being configured to accelerate rotation of the drum, obtain current change function based on current values detected by the detector at a predetermined time interval during the accelerated rotation of the drum, and determine a first motion speed based on a value of a first derivative of the current change function, wherein the current change function is a continuous function representing the current of the motor according to a rotational speed of the motor, wherein the controller is configured to rotate the motor in the first motion speed after determining the first motion speed.

2. The laundry treating appliance of claim 1, wherein the first motion speed is determined based on a rotation speed of the motor corresponding to a predetermined value when the value of the first derivative reaches to a value equal to or less than the predetermined value.

3. The laundry treating appliance of claim 2, wherein the rotation speed of the motor corresponding to the predetermined value is in a range from 10 rpm to 40 rpm.

4. The laundry treating appliance of claim 2, wherein the first motion speed is less than the predetermined value.

5. The laundry treating appliance of claim 2, wherein when the motor is rotated in the first motion speed, the laundry in the drum is repeatedly raised to a position of less than 90 degrees in a rotation direction of the drum and then to be fallen.

6. The laundry treating appliance of claim 2, wherein the controller is configured to obtain an inflection point at which a value of the second derivative in the current change function changes from negative to positive while the drum is accelerating beyond the rotation speed of the motor corresponding to the predetermined value, determine a second motion speed based on the rotation speed of the motor corresponding to the inflection point, stop the motor after rotating the motor in the first motion speed, and then rotate the motor in the second motion speed.

7. The laundry treating appliance of claim 6, wherein the rotation speed of the motor corresponding to the inflection point is in a range from 40 rpm and 60 rpm.

8. The laundry treating appliance of claim 6, wherein the second motion speed is determined to be less than the rotation speed of the motor corresponding to the inflection point.

9. The laundry treating appliance of claim 8, wherein when the motor is rotated in the second motion speed, the laundry in the drum repeatedly raised to a position of 90 to 110 degrees in a rotation direction of the drum and then to be fallen.

10. The laundry treating appliance of claim 1, wherein the controller is configured to accelerate rotation of the motor in a rotational acceleration range from 1.5 rpm/s to 2.5 rpm/s during the accelerated rotation of the drum.

11. A laundry treating appliance comprising:
a drum configured to receive laundry;
a motor rotating the drum;
a detector detecting a current of the motor; and
a controller being configured to accelerate rotation of the drum, obtain a current change function based on current values detected by the detector at a predetermined time interval during the accelerated rotation of the drum, obtain an inflection point at which a value of the second derivative in the current change function changes from negative to positive, and determine a motion speed based on a rotation speed of the motor corresponding to the inflection point, wherein the current change function is a continuous function representing the current of the motor according to a rotational speed of the motor,
wherein the controller is configured to rotate the motor in the motion speed after determining the motion speed.

12. The laundry treating appliance of claim 11, wherein the rotation speed of the motor corresponding to the inflection point is in speed of a range from 40 rpm and 60 rpm.

13. The laundry treating appliance of claim 11, wherein the motion speed is determined to be less than the rotation speed of the motor corresponding to the inflection point.

14. The laundry treating appliance of claim 13, wherein when the motor is rotated in the motion speed, the laundry in the drum repeatedly raised to a position of 90 to 110 degrees in a rotation direction of the drum and then to be fallen.

15. The laundry treating appliance of claim 11, wherein the controller is configured to accelerate rotation of the motor in a rotational accelerate of range from 1.5 rpm/s to 2.5 rpm/s during the accelerated rotation of the drum.

16. A laundry treating appliance comprising:
a drum that receives laundry and is capable of rotating;
a motor rotating the drum;
a current detector detecting a current of the motor; and
a controller being configured to accelerate rotation of the drum, and determine a motion speed of the drum in a drum drive motion based on a current value detected by the current detector in a decision section during the accelerated rotation of the drum, wherein the drum drive motion is set corresponding to the decision section,
wherein the controller is configured to obtain the motion speed by an output of an output layer of a pre-trained machine-learning network based on an input to an input layer of the machine-learning network that comprises the current of the motor detected by the current detector in the decision section.

17. The laundry treating appliance of claim 16, wherein the controller is configured to accelerate a rotation speed of the motor from a first rotation speed to a second rotation speed, wherein the first rotation speed is in a range from 10 rpm to 20 rpm, wherein the second rotation speed is in a range from 80 rpm to 100 rpm.

18. The laundry treating appliance of claim 17, wherein the decision section is a section in which a rotational speed of the drum reaches 40 rpm from the first rotation speed,
wherein the drum drive motion is a rolling motion in which the drum is rotated in the motion speed so that the laundry in the drum is repeatedly raised to a position less than 90 degrees with in a rotation direction of the drum and then to be fallen.

19. The laundry treating appliance of claim 17, wherein the decision section is a section in which the rotational speed of the drum is in a range from 40 rpm to 60 rpm,
wherein the drum drive motion is a tumbling motion in which the drum is rotated in the motion speed so that the laundry in the drum is repeatedly raised to a position of 90 degrees to 110 degrees in a rotation direction of the drum.

20. The laundry treating appliance of claim 17, wherein the decision section is a section in which the rotational speed of the drum is in a range from 60 rpm to 80 rpm,
wherein the drum drive motion is a filtration motion in which the drum is rotated in the motion speed so that the laundry is remained attached to the drum when the drum is rotated in one direction more than one revolution.

* * * * *